H. W. MAHAN.
Hop-Press.

No. 224,097.   Patented Feb. 3, 1880.

Witnesses:
J. W. Garner
Wm. W. Mortimer

Inventor:
H. W. Mahan,
per
F. A. Lehmann,
Atty

UNITED STATES PATENT OFFICE.

HIRAM W. MAHAN, OF CLINTON, NEW YORK.

HOP-PRESS.

SPECIFICATION forming part of Letters Patent No. 224,097, dated February 3, 1880.

Application filed December 15, 1879.

*To all whom it may concern:*

Be it known that I, HIRAM W. MAHAN, of Clinton, in the county of Oneida and State of New York, have invented certain new and useful Improvements in Hop-Presses; and I do hereby declare the following to be a full, clear, and exact description of the invention, such as will enable others skilled in the art to which it pertains to make and use it, reference being had to the accompanying drawings, which form part of this specification.

My invention consists in preparing the hops for the press; and it consists in a suitable frame into which the hops are poured, and in which a snugly-fitting weight is moved up and down by means of a pulley and rope or other suitable mechanism, the said weight being adapted to turn up on edge and let those hops which have been poured in on top of it fall down into the frame below. By means of this weight, which is raised up a suitable distance and then let drop down on the hops below it, there is no necessity for men getting into the frame and stamping the hops down with the feet, whereby the hops are crushed and broken, and their market value greatly reduced in price.

Figure 1:
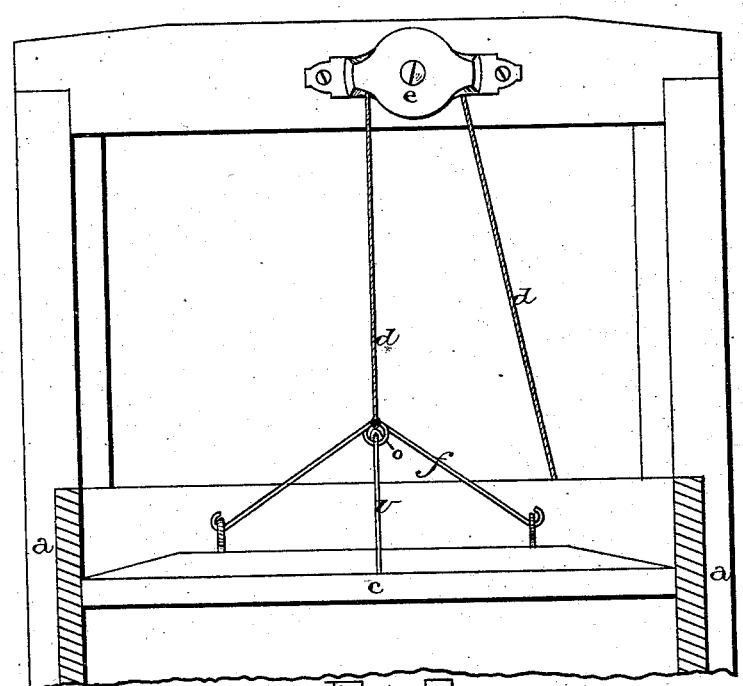
Figure 2:
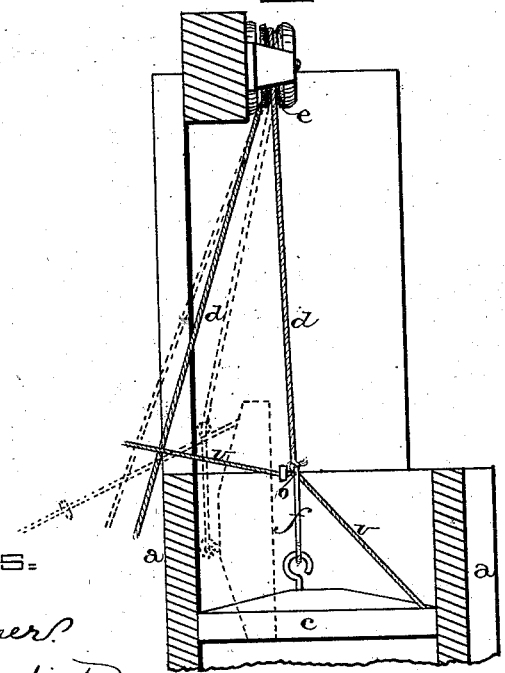

Figure 1 is a longitudinal vertical section of my invention, and Fig. 2 is a vertical cross-section.

*a* represents a suitable rectangular frame, of any desired shape, size, or construction, and into which the hops are poured to be prepared for the press. Moving up and down in this frame is the weight *c*, which snugly fits in the frame, and which is operated by means of the rope *d*, which passes up over the pulley *e* on a rafter above. The lower end of this rope is fastened to the bail *f*, which has an eye in its center, and which has its two ends loosely attached to the top of the weight, as shown. Fastened to one edge of this weight, near its center, and passing up through the eye *o* in the bail, is the rope *v*. By pulling on this rope the weight can be turned up on edge, as shown in Fig. 2.

The weight is first raised up a suitable distance above the top of the frame, so as to be out of the way, and then the hops are poured into the frame. The weight is then allowed to descend upon them a suitable number of times, so as to compress them, and while the weight is being thus operated more hops are being poured into the frame on top of the weight. As soon as the hops below are sufficiently compressed a pull is given upon the rope *v*, which causes the weight to be raised up on edge, and then the hops on top of it drop down into the frame below, ready to be compressed by the weight.

By thus using a drop-weight there is no need for men getting in the frame to compress the hops by treading them down, the services of at least two men can be dispensed with, and the hops are not crushed and broken, so as to impair their value, as is always the case when the feet are used.

After the hops have been sufficiently compressed by means of the weight they are ready to be pressed and baled.

Having thus described my invention, I claim—

1. The combination of a frame, a rising-and-falling weight to compress the hops placed in the frame, and a means for tilting the weight up on one edge, substantially as shown.

2. The combination of the frame, the rising-and-falling weight, the bail fastened to the top of the weight, and ropes *v d*, the parts being combined to operate substantially as set forth.

In testimony that I claim the foregoing I have hereunto set my hand this 11th day of December, 1879.

H. W. MAHAN.

Witnesses:
B. LEWIS BLACKFORD,
LEM. TOWERS, Jr.